(No Model.) 2 Sheets—Sheet 1.

R. B. PULLAN.
CAR FENDER.

No. 563,062. Patented June 30, 1896.

Witnesses
Louis F. Julihn
Charles E. Riordon

Inventor
Richard B. Pullan
By Butterworth & Dowell
his Attorney

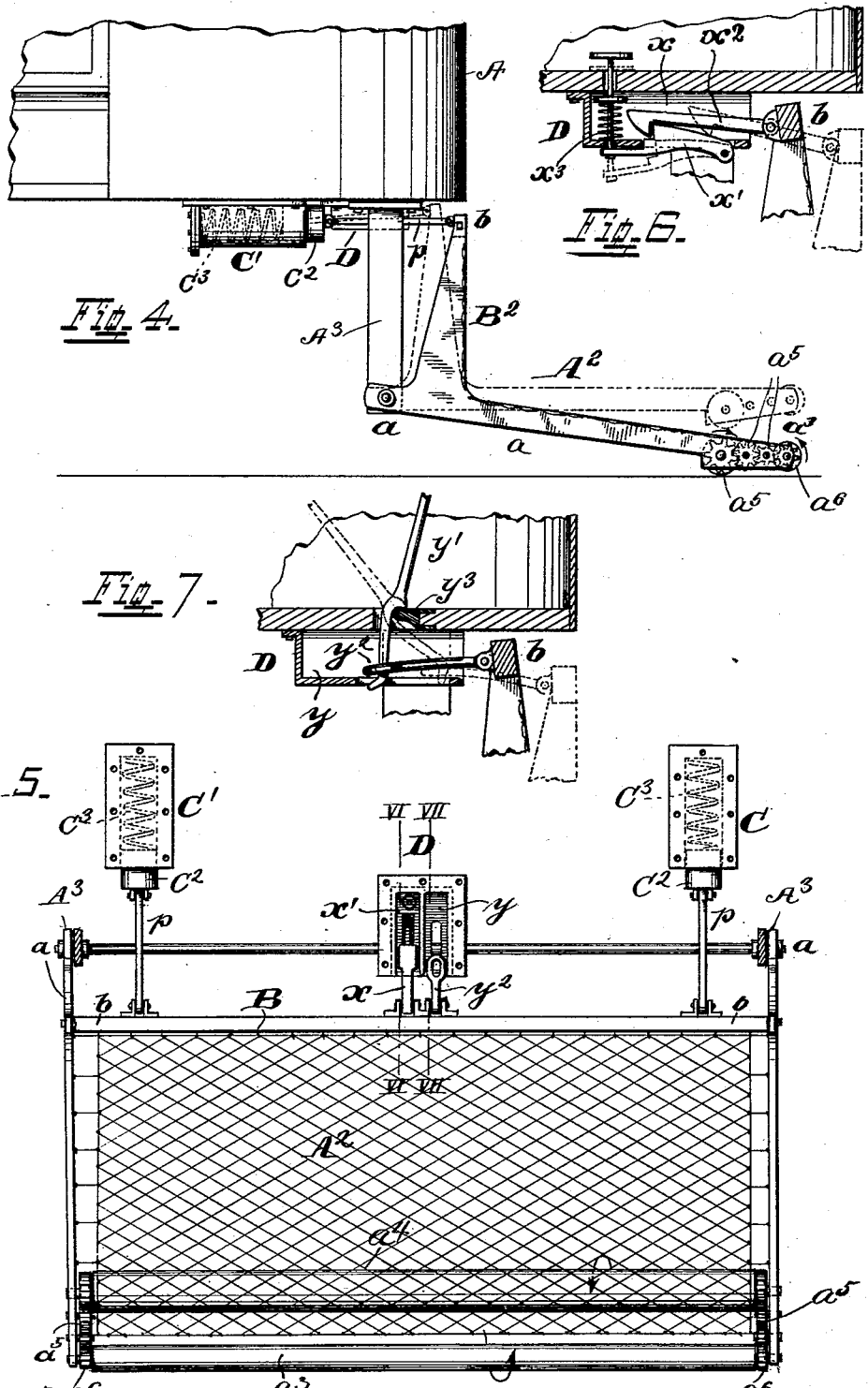

UNITED STATES PATENT OFFICE.

RICHARD B. PULLAN, OF CINCINNATI, OHIO.

CAR-FENDER.

SPECIFICATION forming part of Letters Patent No. 563,062, dated June 30, 1896.

Application filed January 9, 1896. Serial No. 574,921. (No model.)

*To all whom it may concern:*

Be it known that I, RICHARD B. PULLAN, a citizen of the United States, residing at Pullan avenue, Cincinnati, county of Hamilton, State of Ohio, have invented a new and useful Device to Save the Lives of Persons Struck by Electric Cars, of which the following is a specification.

This invention relates to fenders for vehicles, but more particularly to drop-fenders for electric and other cars.

The primary object of my invention is to provide means whereby a fender may be normally held above the ground and released by the motorman, gripman, or other attendant, so as to have the forward or free end thereof automatically forced and held upon the ground, in order to prevent injury to an object or person when struck by the car.
A further object is to provide a fender of simple construction adapted to be attached to the car or other vehicle so as to prevent a person, when struck thereby, being dragged or forced under the same, thereby effectually preventing the possibility of the wheels or other portion of the car from passing over or otherwise injuring the person or object.

Figure 1:
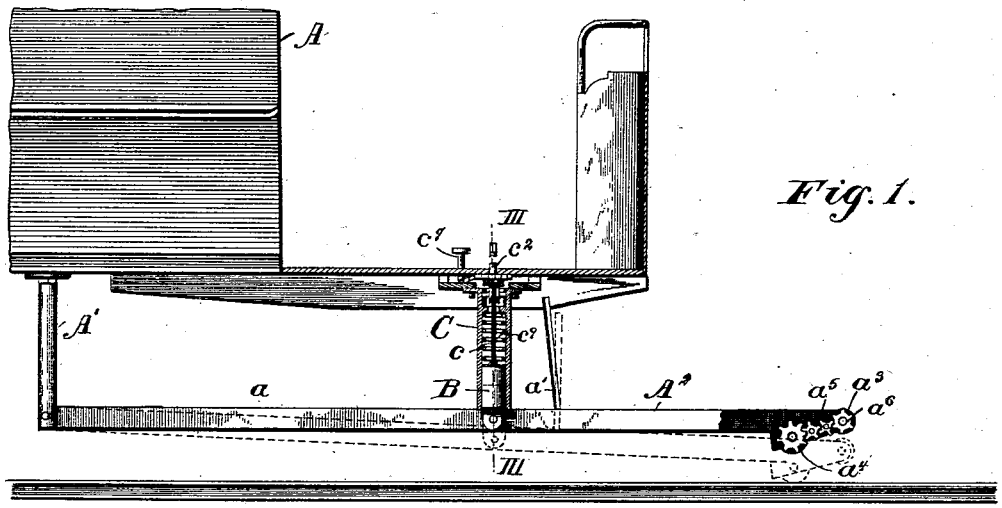
Figure 2:
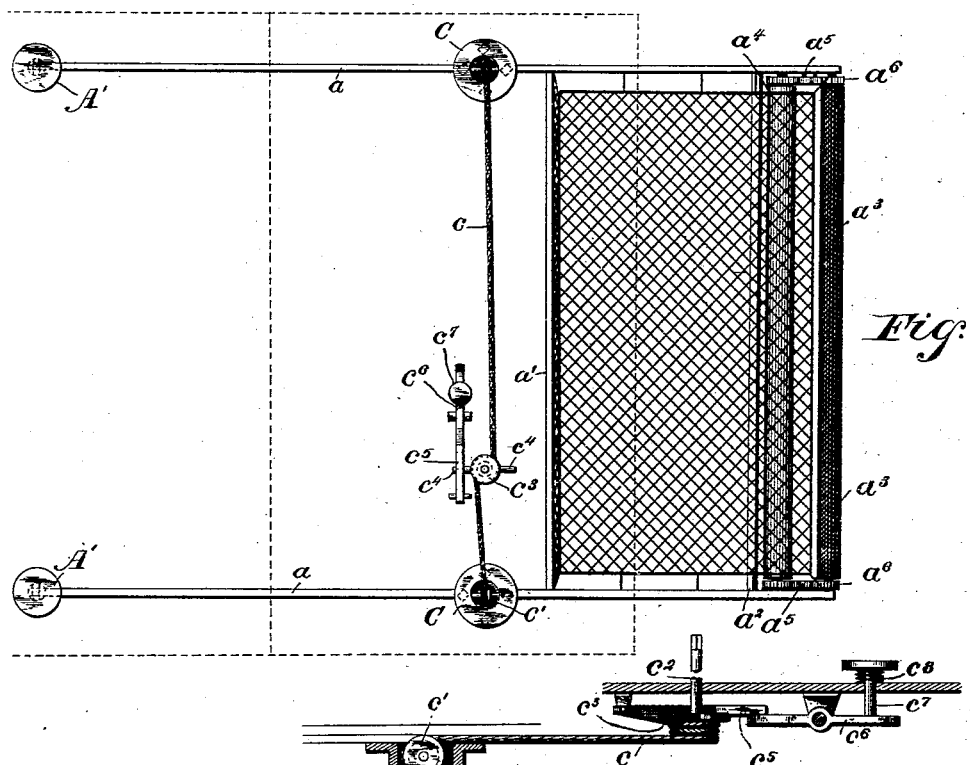
Figure 3:
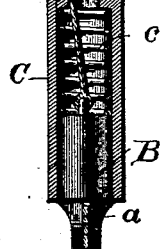

Other objects are to provide simple and compact means, located within convenient reach of the attendant, for raising and holding the fender suspended above the ground; and to provide means for releasing the raising mechanism, and for forcing and holding the free end of the fender upon the ground.
With these and other objects in view the invention consists in the construction and combination of the several parts substantially as hereinafter described, and then pointed out in the claims at the end of the description.
Referring to the accompanying drawings, forming a part of this specification, Figure 1 is a fragmentary side elevation, partly in section, of a car embodying my invention, illustrating in elevation and section the mechanism for holding the fender in its normal position, and for releasing and forcing the forward portion thereof upon the ground. Fig. 2 is a plan view of the fender and the raising and releasing mechanism therefor, the car body and platform being shown in dotted lines. Fig. 3 is a sectional view on the line III III of Fig. 1 through one of the plunger-casings, showing in elevation the raising and releasing mechanism for the fender. Fig. 4 is a side elevation of a modified form of fender and operating mechanism therefor. Fig. 5 is a plan view of the fender and mechanism removed from the car. Fig. 6 is a sectional view on the line VI VI of Fig. 5, illustrating in elevation the locking and releasing mechanism; and Fig. 7 is a sectional view on the line VII VII of Fig. 5, illustrating a means for raising the fender.

In the drawings, A may designate a car of any suitable construction having preferably the depending standard $A'$ rigidly secured thereto in advance of the forward wheels of the car-truck and on opposite sides of the car. These standards have the inner ends of the bars or side pieces $a$ of the fender $A^2$ pivoted thereto, so as to swing up and down thereon and project the proper distance in front of the car-platform, said side bars being provided with an upright or guard frame $a'$, secured thereto or formed integrally therewith, and with a brace or braces $a^2$ extending across the forward portions thereof, in order to retain and hold the side bars in their proper positions relatively to each other.

The side bars $a$ have a roller $a^3$ journaled in their forward ends, which may be covered with rubber or otherwise protected, so as to prevent injury to an object or person when struck thereby, and in the rear of the roller $a^3$ and preferably below the same is a roller $a^4$, also journaled in the side bars $a$ and provided on opposite sides thereof with gears secured to its shaft or otherwise arranged to rotate with said roller. These gears mesh with and are adapted to rotate two or more idlers $a^5$, which in turn impart movement to gears $a^6$, located upon the shaft of the roller $a^3$ or otherwise secured thereto, in order to rotate the latter in a direction opposite to the movement of the car when the roller $a^4$ rests upon the ground, as shown in dotted lines in Fig. 1, so that a person or object may be forced upon and not underneath the fender. Between the side bars and arranged over the roller $a^4$ is suitably suspended an apron of netting or other yielding material, which preferably extends rearward, so as to form an apron for the guard-frame $a'$, though each apron may be separate or otherwise made, so that a yielding surface may be provided of the usual or of any preferred form.

For the purpose of raising and holding the fender above the ground I preferably provide pistons or plungers B, pivoted or otherwise secured to the side bars $a$, intermediate their ends, and arranged to slide in depending casings or cylinders C, located, preferably, in advance of the forward steps and on opposite sides of the car. These plungers may be cylindrical or polygonal and have secured thereto a chain, rope, or suitable flexible connection $c$, which may pass through the central portion of the casings and over pulleys $c'$, rotatably held in the upper portions of said casings, and then around the lower end of a rod or bar $c^2$, so as to pass on opposite sides thereof, as shown in Fig. 1. The rod $c^2$ is rotatably held in a suitable support and passes through the platform a suitable distance, so as to be in convenient reach of the gripman, motorman, or other attendant, and is preferably provided with a polygonal upper end, so that a wrench or other handle may be attached thereto for winding the chain or other connection thereon and raising the plungers and fender to its normal position, as shown in full lines in Fig. 1. A disk or wheel $c^3$, provided with teeth or projections $c^4$, is secured to the rod $c^2$ beneath the platform, so as to be engaged by a dog $c^5$, which is pivoted at its forward end to a support or otherwise, so as to permit the rod and disk to be rotated in one direction, and to permit the rod to rotate in the opposite direction when the dog is moved on its pivot. By this means the forward end of the fender may be raised above the ground and held in such position until the dog $c^5$ is released from the teeth or projections of the disk $c^3$.

In order to permit the dog to be readily released by the motorman or other attendant, and for forcing the fender to a safety position in case of danger, I provide a lever $c^6$, pivoted or fulcrumed intermediate its ends and having one of its ends adapted to contact with the dog $c^5$, so as to raise the same on its pivot and release the disk or wheel $c^3$, and its other end provided with a stem or rod $c^7$, which passes through the platform of the car in convenient reach of the foot of the motorman or attendant. This stem may have a button or knob on its upper end and is normally pressed upward by a spring $c^8$, in order to permit the dog $c^5$ to engage the projections on the disk or wheel $c^3$ when the stem is not depressed.

A spring or springs $c^9$ is arranged in each casing or cylinder and interposed between the upper surface of the plunger B and a flange or projection located near the upper surface of the casing, the springs being compressed by the plungers when raised by the rod $c^2$, so that when the stem $c^7$ is depressed by the motorman and the dog $c^5$ released from the disk $c^3$ the recoil of the springs in the casings will force the roller $a^4$ downward so as to rest upon the ground with sufficient force to rotate the same and impart rotary motion to the roller $a^3$.

The construction and operation of the invention will be readily understood from the foregoing description, taken in connection with the accompanying drawings. If the parts are in their normal position, as shown in full lines in Fig. 1, and it is desired to prevent injury to an object or person who may happen to be in the way as the car is driven forward, it will be readily seen, if the motorman or attendant depresses the stem $c^7$ by his foot, or otherwise, that the dog $c^5$ will be disengaged from the teeth or projections on the disk $c^3$, so that the plungers B will be forced downward in the casings C by the springs $c^9$. This movement of the plungers will force the forward end of the fender to the position shown in dotted lines, so as to cause the roller $a^4$ to rest upon the ground with sufficient force to rotate the same and impart movement to the roller $a^3$, through the idlers $a^5$ and gears $a^6$, in a direction opposite to the movement of the car, so that the object or person struck may be forced forward or upon the apron of the fender instead of beneath the same. When the danger is passed, the attendant, by means of a wrench or handle, may rotate the rod $c^2$ so as to wind the chain or connection $c$ thereon and raise the plungers and fender to its normal position, in order to compress the springs $c^9$ for again forcing the fender to safety position when desired, the dog $c^5$, by engaging the projections on the disk $c^3$, preventing the unwinding of the chain until released.

I thus provide simple and convenient means for normally holding the fender the proper distance above the ground, and for releasing and forcing the forward end of the fender to the ground in cases of danger, so as to prevent injury to an object or person, and to prevent the same being dragged or permitted to pass under the fender.

The fender may be raised by chains or connections adapted to be wound around the foot of the ordinary car-brake post, or the means for lifting the fender may be independent of the brake mechanism, as shown, and located in any convenient position.

Instead of the side bars extending rearward and pivoted to depending standards located adjacent to the forward wheels of the car-trucks, and provided with a post and flexible connection for raising the fender, I may arrange the parts and provide the means shown in Figs. 4 to 7, inclusive. In this case the side bars $a$ of the fender $A^2$ are much shorter and pivoted to standards $A^3$, located near the forward portion of the platform. The uprights $B^2$ may be riveted or otherwise secured to the side bars $a$, and are secured at their upper ends by a cross-bar $b$, so as to form a guard-frame which may be covered by wire-netting or other yielding material in the usual or in any preferred manner.

At $C'$ are the casings, which, instead of being vertically arranged, are adapted to be secured in a horizontal position under the platform, and have the plungers or pistons $C^2$ slidingly held therein, so as to be normally pressed outward by springs $C^3$ arranged in the casings and interposed between the plunger and the head of the casings or cylinders. These plungers are connected to the cross-bar $b$ by connecting rods or links $p$, so that when the fender is raised to the position shown in dotted lines in Fig. 4 the plungers will compress the springs in the casing $C'$, so as to tend to normally force the forward end of the fender to the position shown in full lines.

As a means for raising the fender, and for holding and releasing the same when raised, I may provide a box or casing D, having an open outer end and divided by a partition into two chambers $x$ and $y$. In chamber $x$ is pivoted a dog $x'$, having a tooth adapted to engage the inner end of a catch or detent $x^2$, which slides into the box D, and has its outer end pivoted or secured to the cross-bar $b$. This dog is yieldingly pressed upward by a spring $x^3$, which surrounds the stem $x^4$ within the chamber $x$, said stem being passed through the platform and provided with a knob or button in convenient reach of the foot of the motorman or attendant, so that by depressing the stem the dog $x'$ will be disengaged from the catch or detent, so that the recoil of the springs $C^3$, acting upon the plungers in the casings $C'$, will force the cross-bar $b$ to the position shown in dotted lines in Fig. 6. For raising the fender a lever $y'$ is provided, which has its handle arranged so as to be readily operated by the attendant, and its lower end passed through the floor of the platform and engaging an eye in link $y^2$. A fulcrum $y^3$ may be secured to the floor of the platform, provided with a rounded portion adapted to form a rest or support for a hooked portion of the lever in order to serve as a pivot therefor, as shown in Fig. 7, so that the motorman or attendant may move the handle of the lever forward and raise the fender. This movement of the lever will cause the detent $x^2$ to engage the dog $x'$, which, when released by depressing the stem $d^5$, will permit the springs $C^3$ to force the forward end of the fender to the ground, as heretofore explained.

Having thus fully described my invention, what I claim as new, and desire to secure by Letters Patent of the United States, is—

1. The combination with a movable vehicle, of a fender pivoted thereto so as to swing up and down thereon, casings arranged on opposite sides of the vehicle, plungers slidingly held in said casings and connected to the fender, springs acting upon the plungers for normally forcing the forward or free end of the fender downward, mechanism for raising the fender so as to compress the springs, means for holding the fender when raised, together with means for releasing the raising mechanism, whereby the recoil of the springs may force the free end of the fender downward so as to prevent injury to an object or person in case of danger, substantially as described.

2. The combination with a movable vehicle, of a fender pivoted thereto so as to swing up and down thereon, plungers slidingly held upon the vehicle and pivotally connected to the fender, springs acting upon the plungers so as to force the forward or free end of the fender downward, mechanism for raising the fender and storing power in the springs, a dog pivoted at one of its ends beneath the car and having its other end engaging the fender-raising mechanism so as to retain the fender suspended, together with a spring-pressed stem passing through the platform and adapted to be depressed by the attendant so as to engage and release the dog, whereby the free end of the fender may be forced downward so as to prevent injury to an object or person in case of danger, substantially as described.

3. The combination with a movable vehicle, of a fender pivoted thereto so as to swing up and down thereon, casings located on opposite sides of the vehicle, plungers arranged in the casings and pivotally connected at one of their ends to the fender, springs acting upon the plungers tending normally to force the free end of the fender downward, a flexible connection secured to the plungers, a rod for winding the flexible connection thereon so as to raise the plungers and fender and store power in the springs, a dog for preventing the unwinding of the flexible connection, together with means for releasing the dog, whereby the free end of the fender may be forced downward so as to prevent injury to an object or person when struck thereby, substantially as described.

4. The combination with a movable vehicle, of a fender pivoted thereto so as to swing up and down thereon, casings arranged on opposite sides of the vehicle, plungers slidingly held in said casings and connected to the fender, springs acting upon the plungers for normally forcing the forward or free end of the fender downward, mechanism for raising the plungers and storing power in the springs, a dog adapted to retain the fender raised, together with a spring-pressed stem adapted to release the dog, whereby the forward or free end of the fender may be forced downward, so as to prevent injury to an object or person in case of danger, substantially as described.

5. The combination with a movable vehicle, of a fender pivoted thereto so as to swing up and down thereon, casings arranged on opposite sides of the vehicle, plungers held in said casings and connected to the fender, springs for normally forcing the forward or free end of the fender downward, means for raising the fender so as to compress the springs, and means for releasing the raising mechanism; said fender being provided with a pair of rollers journaled in the forward portion thereof one in advance of the other, and connections between the rollers for rotating the latter in opposite directions when the forward end of the fender is forced downward so that the rear roller will rest upon the ground, whereby the object or person may be forced forward or upon the fender in case of danger, substantially as described.

6. The combination with a movable vehicle, of a fender pivoted thereto so as to swing up and down thereon, casings arranged on opposite sides of the vehicle, plungers held in said casings and connected to the fender, springs for normally forcing the forward or free end of the fender downward, means for raising the fender so as to compress the springs, and means for releasing the raising mechanism; said fender comprising side bars, a pair of rollers journaled in the forward ends of said bars, one in advance of and slightly above the other, and gears connecting the rollers so as to rotate in opposite directions when the forward end of the fender is forced downward so that the rear roller will rest upon the ground, whereby the object or person may be forced forward or upon the fender in case of danger, substantially as described.

RICHARD B. PULLAN.

Witnesses:
L. L. BRASHER,
R. B. PULLAN, Jr.